(No Model.) 3 Sheets—Sheet 1.
G. FORBES.
DYNAMO ELECTRIC MACHINE.
No. 518,945. Patented May 1, 1894.
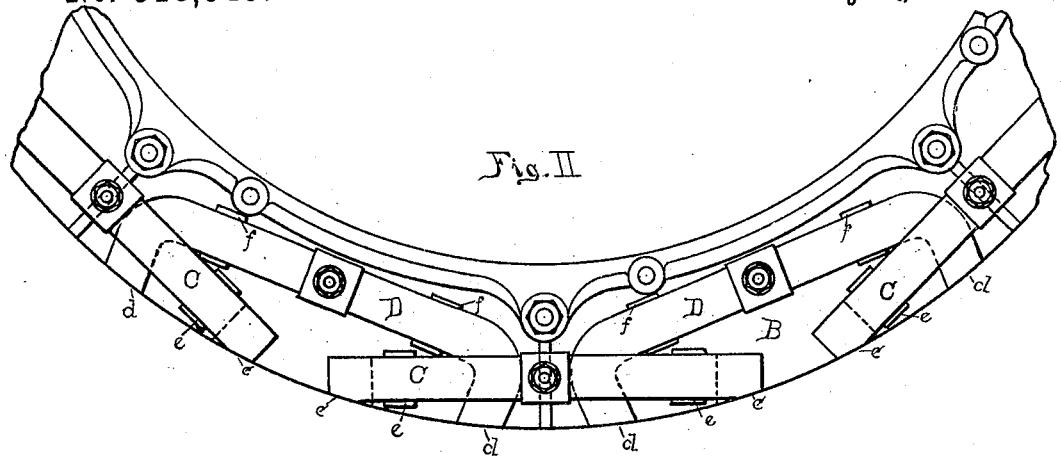
Fig. II
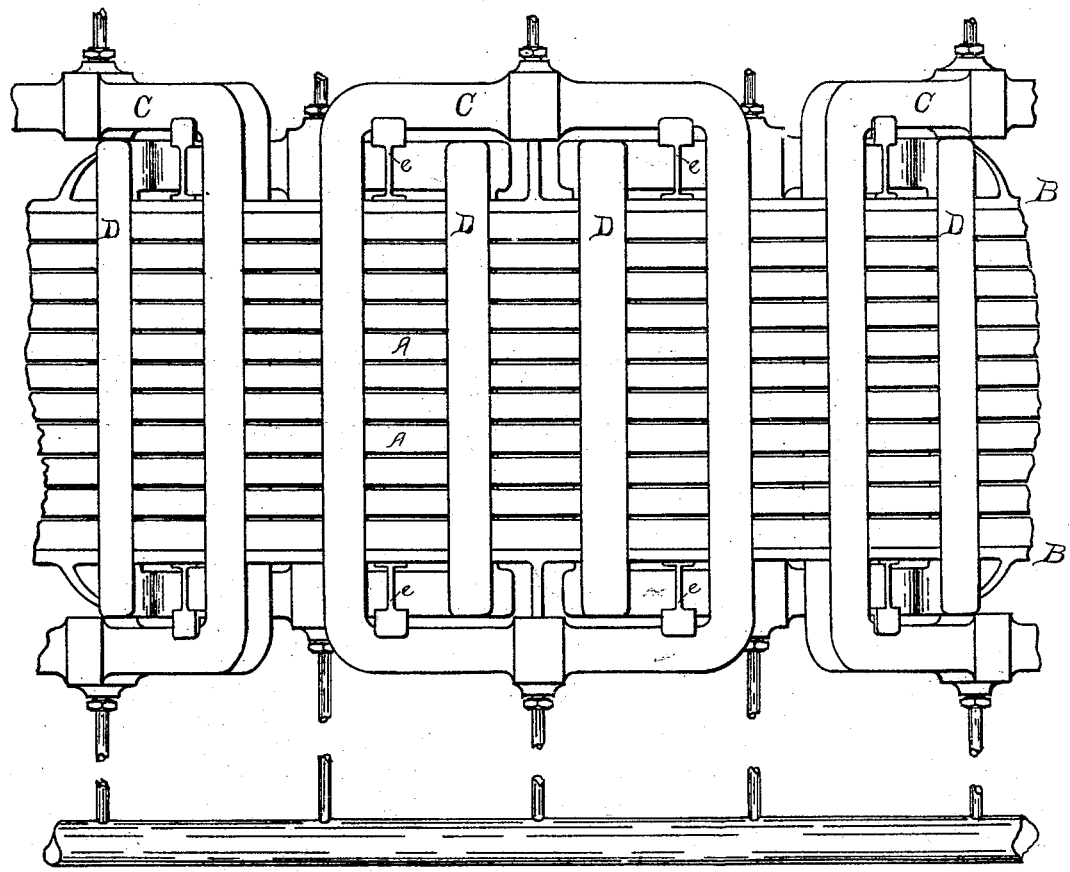
Fig. I
Witnesses.
C. W. Ricker
B. C. Bandee
Inventor.
George Forbes,
per William Macomber
Attorney (No Model.) 3 Sheets—Sheet 2.
G. FORBES.
DYNAMO ELECTRIC MACHINE.
No. 518,945. Patented May 1, 1894.
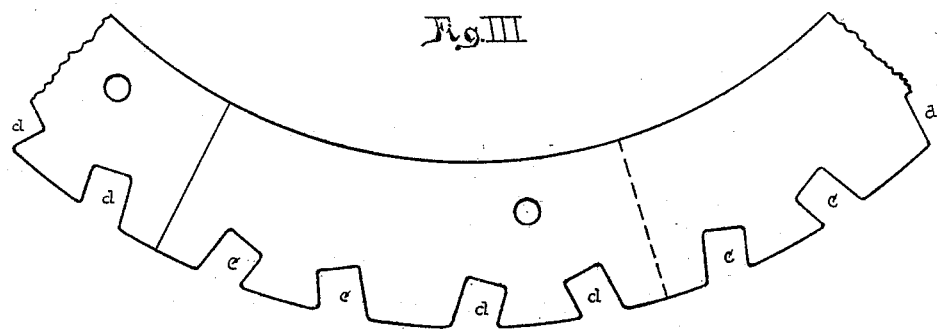
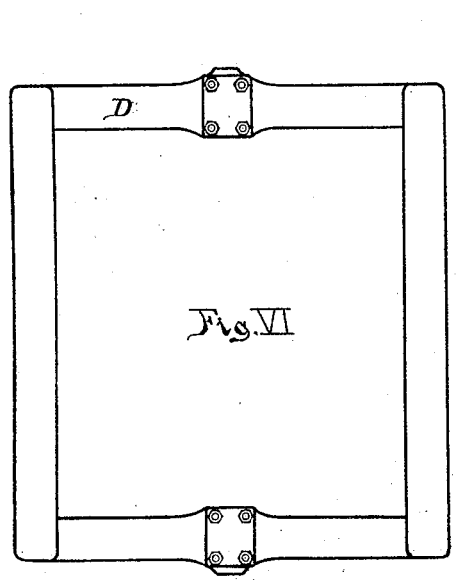
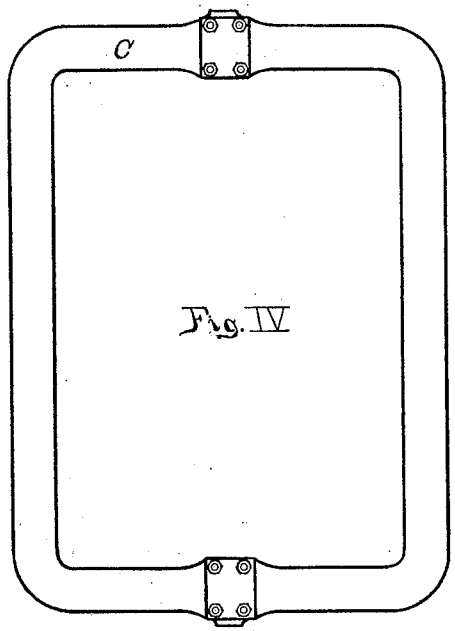
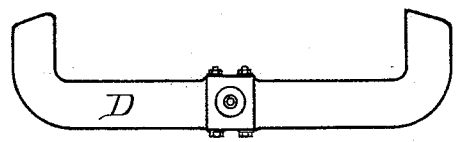
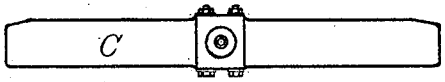
Witnesses.
C W Ricker
B B Candee
Inventor.
George Forbes
per William Macomber
Attorney.
THE NATIONAL LITHOGRAPHING COMPANY,
WASHINGTON, D. C.

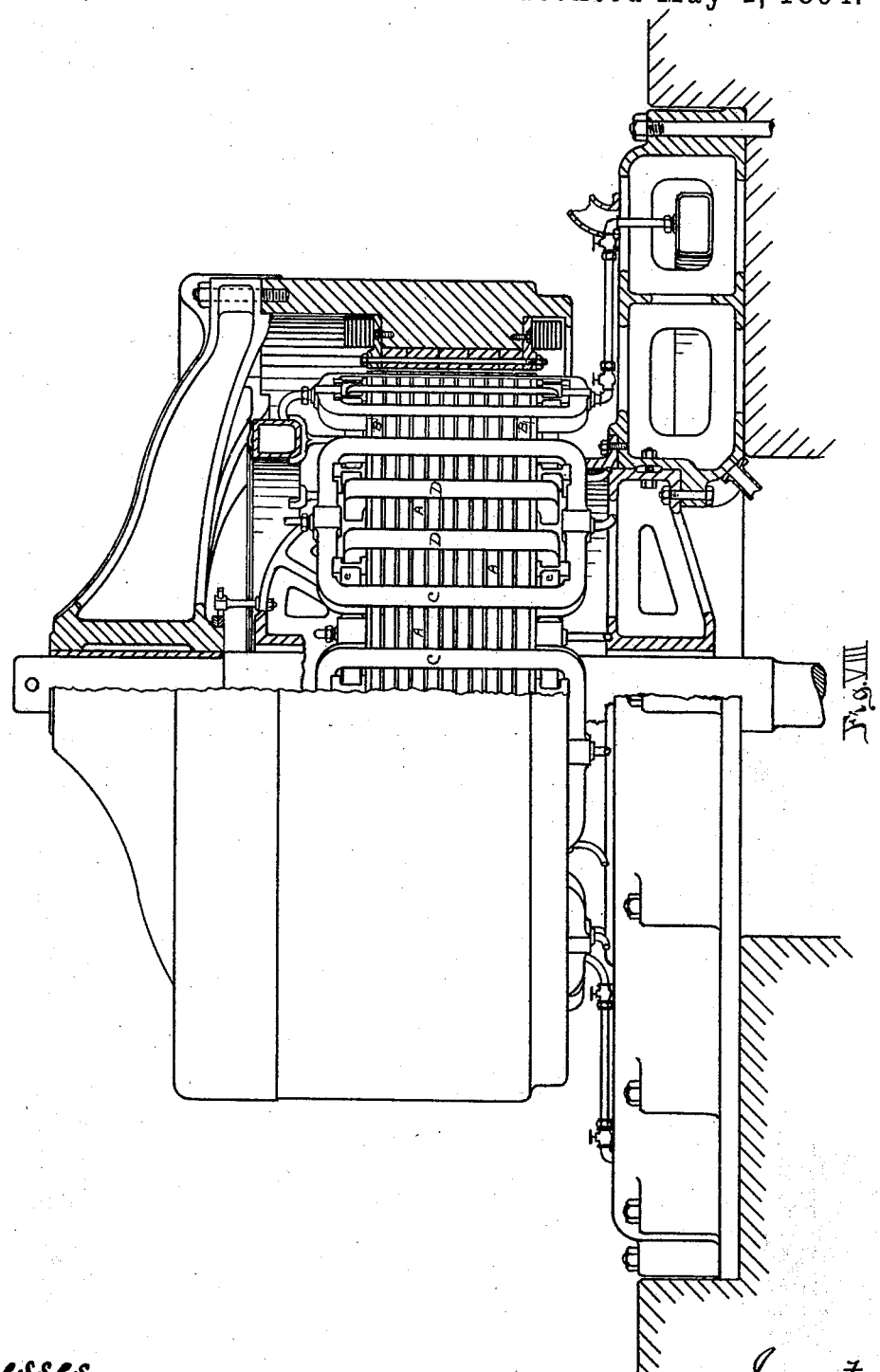

UNITED STATES PATENT OFFICE.

GEORGE FORBES, OF NIAGARA FALLS, NEW YORK.

DYNAMO-ELECTRIC MACHINE.

SPECIFICATION forming part of Letters Patent No. 518,945, dated May 1, 1894.

Application filed August 17, 1893. Serial No. 483,357. (No model.)

*To all whom it may concern:*

Be it known that I, GEORGE FORBES, a subject of the Queen of Great Britain, residing at Niagara Falls, in the county of Niagara and State of New York, have invented certain new and useful Improvements in Dynamo-Electric Machines; and I do hereby declare the following to be a full, clear, and exact description of the invention, such as will enable others skilled in the art to which it appertains to make and use the same.

My invention relates more particularly to a new and improved method of constructing the armature and coil or solenoid in dynamo electric machines, and particularly with reference to the manner of fitting in the coils or solenoids upon the body of the armature. I find that for certain purposes it is desirable to make dynamos with a revolving external field magnet. In the case of accident happening to one of the armature coils or solenoids, it is desirable to have a means of replacing it quickly and well, after the fields have been removed. For this purpose I arrange notches in the face of the armature into which I insert the coils; but instead of making the two notches for one coil or solenoid radial, I make them parallel. I make the coils of two shapes, so that one kind is wound all in one plane, and goes outside of the second kind of coil or solenoid at the ends of the armature. The second kind of coil or solenoid is bent when crossing the armature ends into such a shape as to be clear of the coils or solenoids of the first kind. I shape the two coils in such a way that the total length of wire and the number of turns on each kind of coil is the same, as in the construction shown I desire to generate two currents of equal electrical effect;
but I do not limit myself in this respect, as I sometimes find it convenient to generate two separate currents of different electrical effect. I support each coil at the ends of the armature by insulated pieces fixed to the end plates of the armature.

In the general design and construction herein shown, I have shown a machine with a stationary armature properly secured upon bed-plates, having a vertical shaft which is supported within the armature within journals which are bracketed to the interior frame work of the armature which is in turn secured to the bed-plates. Upon the upper end of the shaft is rigidly secured a spider, the legs of which are secured to the cylindrical field which revolves externally about the armature, having radial and inwardly projecting pole pieces, and which, as a whole, constitutes a bell-shaped revolving field magnet.

While I have shown a novel and desirable construction of field magnets in connection with a fixed armature, and which is my invention, I do not claim herein those features, as they constitute the subject-matter of a separate application for Letters Patent made by me, filed August 17, 1893, Serial No. 483,356. But I have shown and herein described this construction as best illustrating the application of my present invention. Moreover, it is plain to any person skilled in the art that the invention herein described and claimed, by the exercise of ordinary mechanical skill, can be adapted to other types of machines; and I do not therefore limit my invention to the construction herein shown.

I have also shown a particular and novel type of coil or solenoid, which is so constructed with a close-fitting oil-tight casing as to be provided with a forced circulation of oil. But I do not herein claim the same, except as entering into the combination as an element thereof, as that particular invention constitutes the subject-matter of a separate application for Letters Patent by me, filed August 17, 1893, Serial No. 483,358.

Referring to the drawings herewith, consisting of three sheets: Figure 1 is an elevation of a portion of an armature provided with my invention. Fig. 2 is a top plan view of a portion of the same. Fig. 3 is a plan view of a portion of the armature plates with parallel notches for the two sides of each coil to allow of the coils being readily fitted into their places. Fig. 4 is an elevation of one type of coil or solenoid used. Fig. 5 is a top plan view of the same. Fig. 6 is an elevation of the second type of coil or solenoid used. Fig. 7 is a top plan view of the same. Fig. 8 is an elevation of a machine provided with my invention, a portion of the field being cut away to show the construction of the armature.

Like letters refer to like parts throughout the drawings.

A, A, Figs. 1 and 8, are the plates of which the body of the armature is built up.

B, B, Figs. 1, 2 and 8, are the end plates of the armature.

C, C, Figs. 1, 2, 4, 5 and 8, are the coils of the first type which are wound all in one plane and which fit into the notches c, c, Figs. 2 and 3, and which are most clearly shown in Fig. 3.

D, D, Figs. 1, 2, 6, 7, and 8, are the coils of the second type which are bent over the end plates of the armature so as to clear the first type.

d, d, Figs. 2 and 3, are the notches into which the coils of the second type are fitted upon the face of the armature.

e, e, Figs. 1 and 2, are the supports for the first type of coils, and f, f, those for the second type.

Referring now particularly to Figs. 2 and 3, the notches which are cut through the body A, A, of the armature and through the end plates, are so arranged in pairs that the sides of the notches are parallel in pairs and so situated as to conform to the parallel sides of the coils which fit into them. It is plain how the first series of coils, marked C, C, may be directly fitted into these notches and properly secured by the supports e, e; but the coils of the second type, marked D, D, are better understood by reference to Figs. 2, 6, 7 and 8. In these coils the sides of the coils fit into the notches in precisely the same manner as do the coils of the first type; but the ends of these coils are bent over the end plates of the armature so as to pass underneath the ends of the coils of the first type, and so that the ends of the coils of the second type pass within the sides of the coils of the first type upon the ends of the armature. In this manner the sides of the coils are all placed within a single cylindrical plane upon the periphery of the armature, as is clearly shown in Figs. 1 and 2; and by means of the supports e, e, and f, f, which are removably secured to the end plates of the armature it is apparent that when the field is removed from about the armature one or more of these coils can be removed for purposes of repair or otherwise.

Having thus described my invention and the method of its application, I do not claim the construction of an armature provided with two types or series of coils, or the construction of a biphase or polyphase machine; but

What I do claim is—

The combination of an armature having parallel notches with two types of coils or solenoids having corresponding parallel sides, the ends of the coils of the second type being bent over the ends of the armature and passing within and clear of the coils of the first type, substantially as described.

In testimony that I claim the invention above set forth I affix my signature in the presence of two witnesses.

GEORGE FORBES.

Witnesses:
 MORRIS COHN, Jr.,
 C. W. RICKER.